US007823072B2

(12) United States Patent  (10) Patent No.: US 7,823,072 B2
Domenico  (45) Date of Patent: Oct. 26, 2010

(54) METHOD AND SYSTEM FOR CONTROLLING MULTIPLE ELECTRONIC MAIL MESSAGES IN A DATA PROCESSING SYSTEM

(75) Inventor: Raguseo Domenico, Pomezia (IT)

(73) Assignee: International Business Machines Corporation, Armonk, NY (US)

( * ) Notice: Subject to any disclaimer, the term of this patent is extended or adjusted under 35 U.S.C. 154(b) by 2270 days.

(21) Appl. No.: 10/302,498

(22) Filed: Nov. 21, 2002

(65) Prior Publication Data

US 2003/0107593 A1  Jun. 12, 2003

(30) Foreign Application Priority Data

Dec. 11, 2001  (EP)  .................................. 01480131

(51) Int. Cl.
 *G06F 3/00* (2006.01)
 *G06F 9/00* (2006.01)
 *G06F 17/00* (2006.01)
(52) U.S. Cl. ........................................ 715/752; 715/751
(58) Field of Classification Search .................. 715/752, 715/751
 See application file for complete search history.

(56) References Cited

U.S. PATENT DOCUMENTS 6,658,454 B1 * 12/2003 Delany et al. ............... 709/202

6,708,205 B2 * 3/2004 Sheldon et al. ............. 709/206
6,981,223 B2 * 12/2005 Becker et al. ............... 715/777
7,047,499 B2 * 5/2006 Ferri .......................... 715/777
7,200,818 B2 * 4/2007 Becker et al. ............... 715/804

OTHER PUBLICATIONS

Microsoft Corporation, User's Guide, Microsoft Mail, Electronic Mail for PC Networks Windows and Presentation Manager Version 3.0, 1992, pp. 1A, 1-4, 20, 23, 24, 28 and 29.*

* cited by examiner

*Primary Examiner*—Kieu Vu
*Assistant Examiner*—Sabrina I. Greene
(74) *Attorney, Agent, or Firm*—Stephen R. Tkacs; Stephen J. Walder, Jr.; Jeffrey S. LaBaw

(57) ABSTRACT

A method and a corresponding system for controlling multiple notes are disclosed. A multiple note (340) includes a series of (basic) notes (330,335) that have been forwarded by other users. In the proposed representation, the basic notes are arranged in a tabbed pane (345). The tabbed pane consists of multiple overlying panels (350) resembling a stack of pieces of paper lying on top of one another, with only the topmost panel that is visible to a user; a selection tab (355) is attached to each panel. Each panel and the corresponding tab are associated with a respective basic note; particularly, the panel is used to display the basic note, whereas the tab is denoted with the first characters of the subject identifying the corresponding basic note. Therefore, whenever the user wishes to view a desired basic note, he or she simply selects the corresponding tab in order to pop up the respective panel.

20 Claims, 4 Drawing Sheets

METHOD AND SYSTEM FOR CONTROLLING MULTIPLE ELECTRONIC MAIL MESSAGES IN A DATA PROCESSING SYSTEM

The present invention relates to a method and system for controlling multiple electronic mail messages in a data processing system.

An electronic mail (or simply e-mail) system allows users to transmit messages, such as notes entered from a keyboard or electronic files stored on a disk, over communications networks. The use of e-mail systems has exploded in the last years. By some estimates, there are millions of e-mail users sending billion of messages per year. Companies that are fully computerized make extensive use of e-mail because it is fast, flexible, and reliable.

Most of the e-mail systems currently available support multiple notes. A multiple note embeds two or more (basic) notes, which have been typically received by different users. When the multiple note is transmitted over the network, the basic notes included therein are automatically forwarded to another user.

In the e-mail systems known in the art, the basic notes are appended in a sequential order to the multiple note, with a title of the last basic note that automatically becomes the title of the whole multiple note.

A drawback of the solution described above is that the resulting representation of the multiple note is very confusing. Therefore, controlling the multiple note is quite complex, particularly when the number of basic notes is high. As a matter of fact, a user must go through the entire multiple note, in order to read the different basic notes therein included. Moreover, moving from one basic note to another basic note is time consuming, and very annoying for the user. In addition, this representation makes it difficult to identify the different basic notes throughout the multiple note, particularly when a basic note has been in turn redirected and includes one or more notes attached to its end.

It is an object of the present invention to overcome the above-mentioned drawbacks. In order to achieve this object, a method as set out in the first claim is proposed.

Briefly, the present invention provides a method of controlling multiple electronic mail messages in a data processing system including the steps of: providing a multiple electronic mail message embedding a plurality of forwarded basic electronic mail messages, reading the multiple message, providing a selection structure having a plurality of selectable items each one associated with an identifier of a corresponding basic message, and at least partially displaying the basic message associated with a selected item.

Moreover, the present invention also provides a computer program for performing the method, a product storing the program, a data carrier storing the multiple electronic mail message, and a corresponding data processing system.

Further features and the advantages of the solution according to the present invention will be made clear by the following description of a preferred embodiment thereof, given purely by way of a non-restrictive indication, with reference to the attached figures, in which.

Figure 3A:
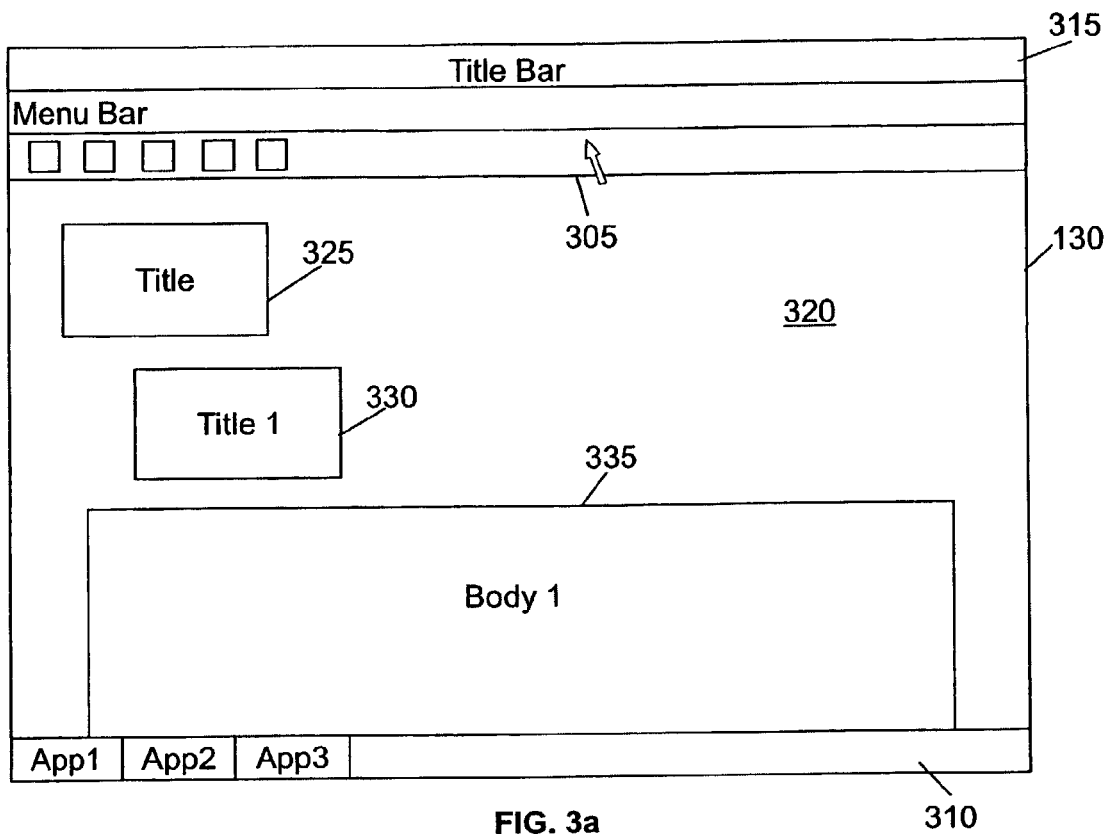
Figure 3B:
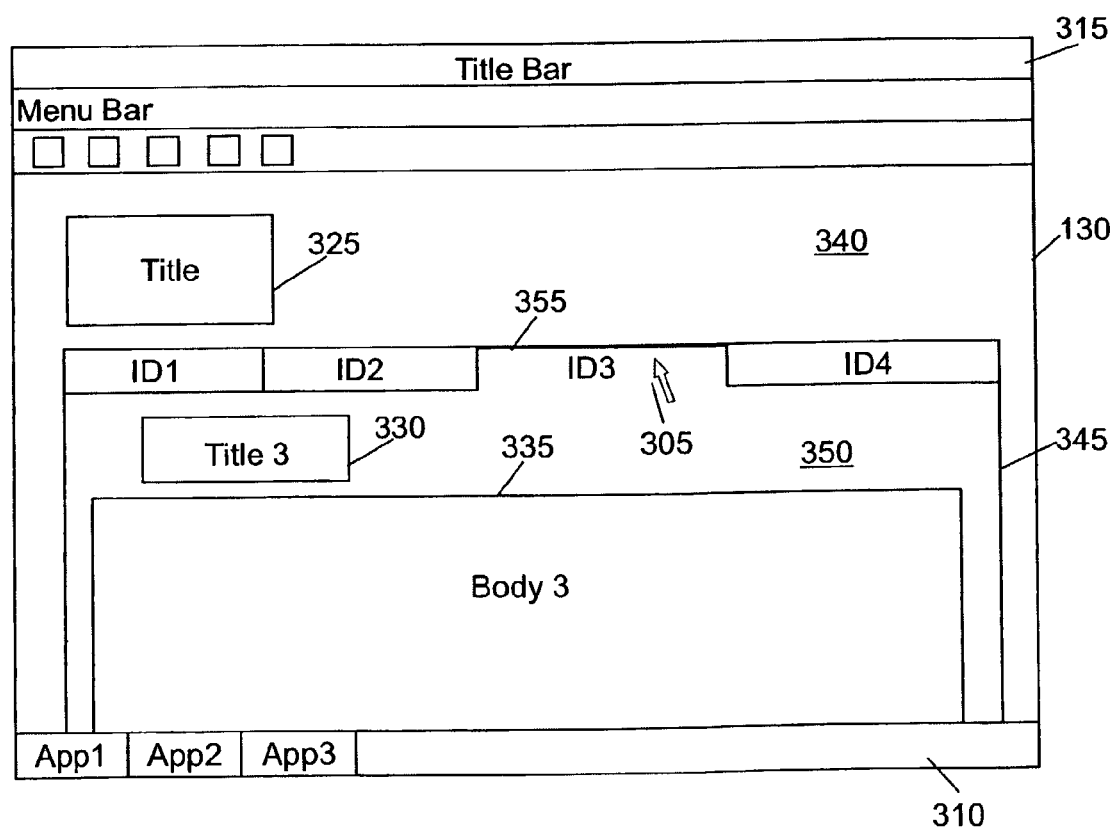
Figure 4:
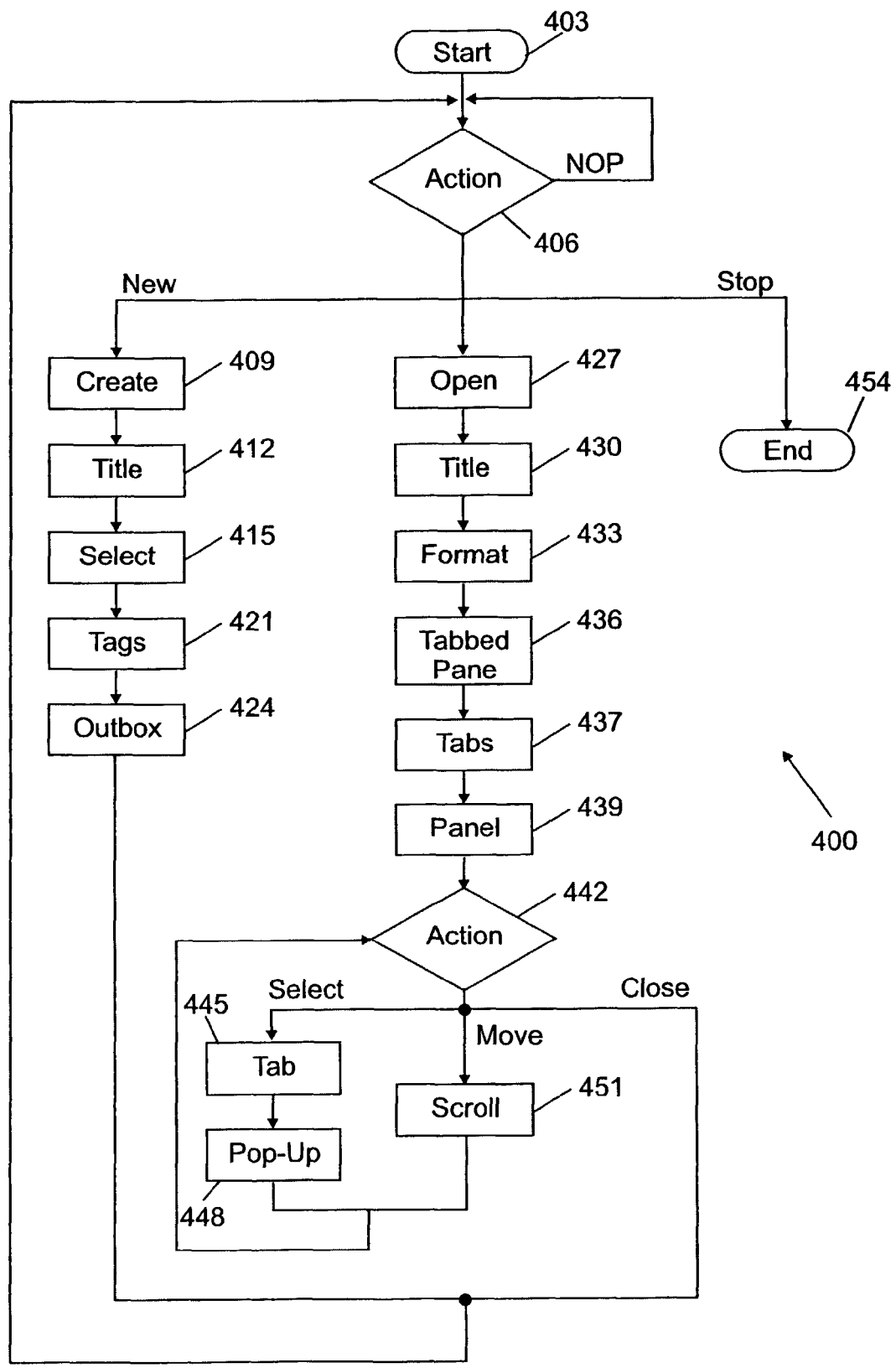

FIG. 3*a*-3*b* depict a multiple electronic mail message formatted according to the prior art and to a preferred embodiment of the invention, respectively;

FIG. 4 is a flow chart describing the logic of a method used for controlling multiple electronic mail messages.

Figure 1:
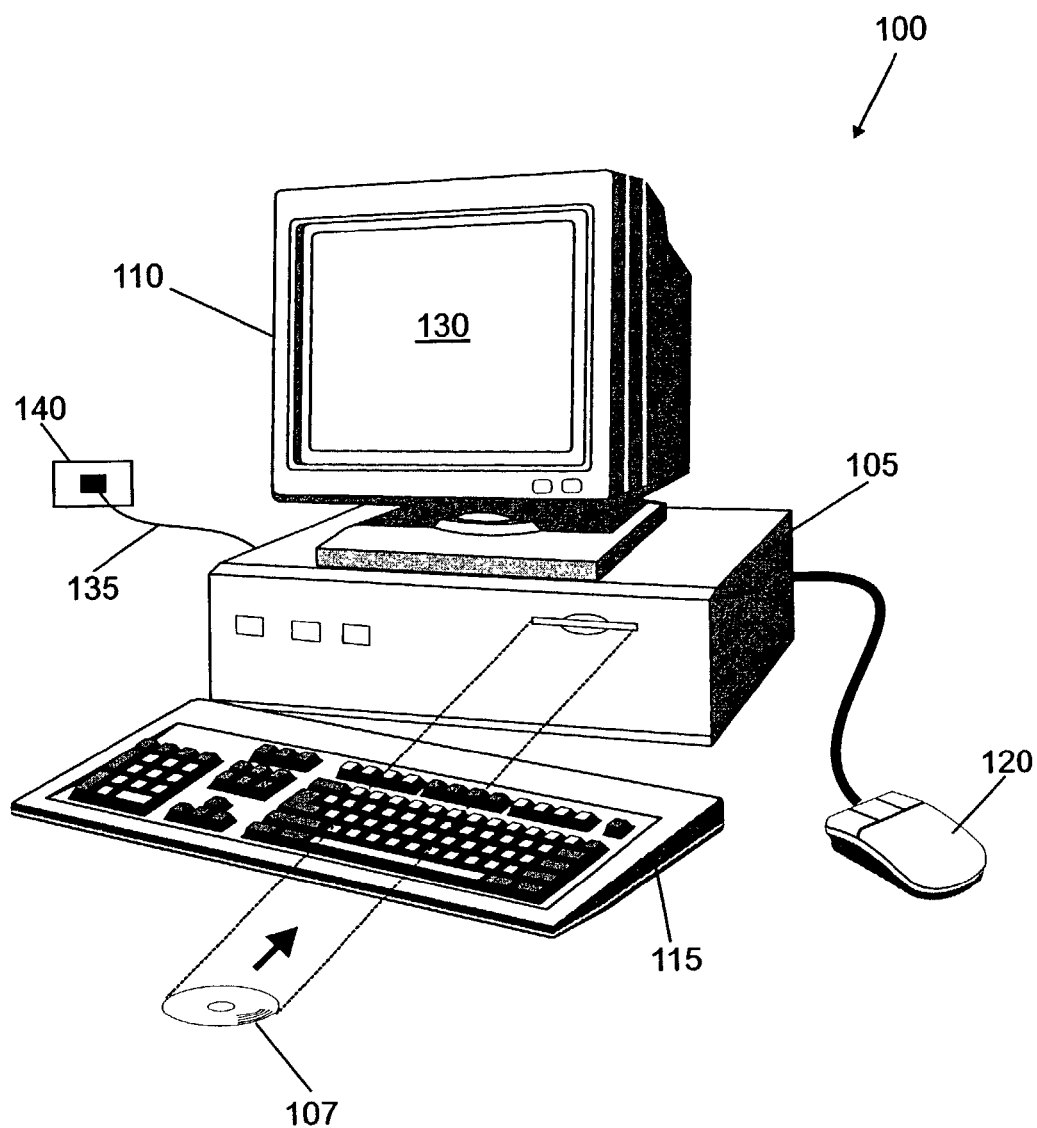
FIG. 1 is a pictorial representation of a computer in which the method of the invention can be used.

With reference in particular to FIG. 1, a computer 100 (typically a Personal Computer, or PC) is shown. The computer 100 consists of a central unit 105, which houses the electronic circuits controlling its operation (such as a microprocessor and a working memory), in addition to a hard-disk and a driver for CD-ROMs 107. A monitor 110 is connected to the central unit 105 in a conventional manner. The computer 100 further includes a keyboard 115 and a mouse 120, which are used to enter data or commands and to manipulate the position of a pointer (not shown in the figure) on a screen 130 of the monitor 110.

A cable 135 is employed to plug the computer 100 into a telephone socket 140. In this way, the computer 100 may be connected to a communication network, such as the INTERNET (by means of an internal MODEM, not shown in the figure). Connection to the INTERNET allows a user of the computer 100 to exchange e-mail messages with other users anywhere in the word.

Similar considerations apply if the computer has a different structure or includes different units, if it is replaced by an equivalent data processing system (such as a workstation), if it is connected to the communication network in a different manner (for example, by means of a LAN), if the exchange of e-mail messages is confined to an internal network, and the like.

Figure 2:
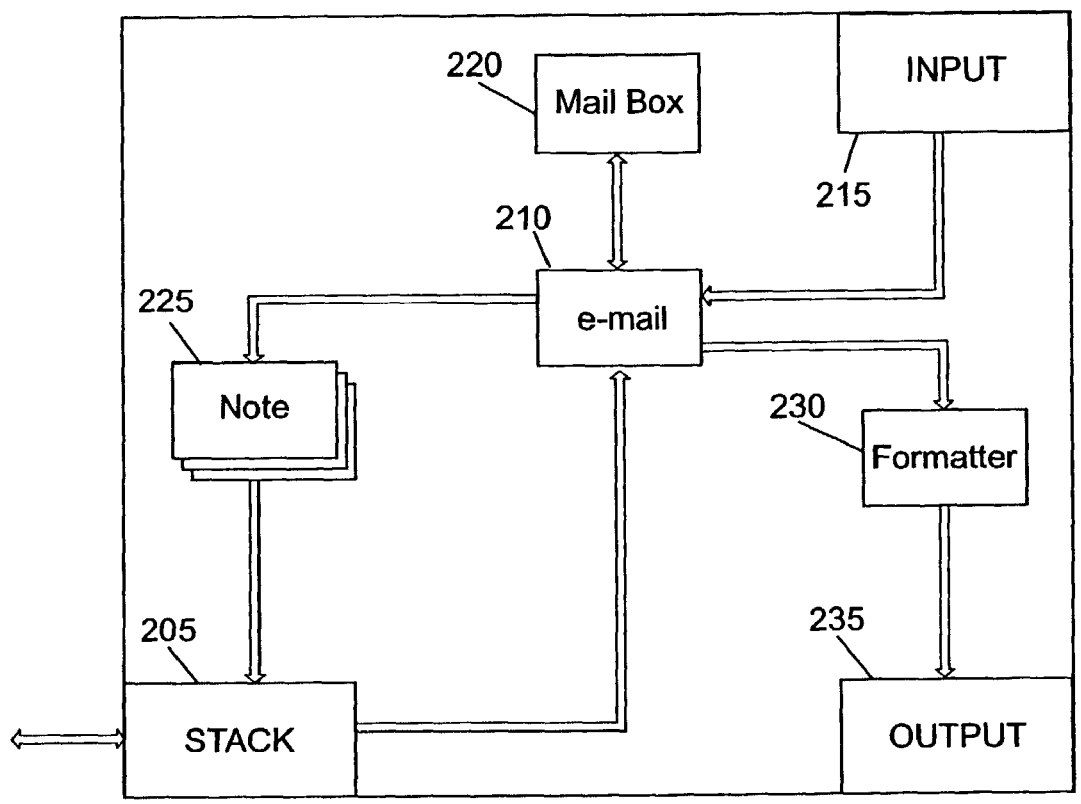
FIG. 2 shows a partial content of a working memory of the computer.

Considering now FIG. 2, a partial content of the working memory of the computer in operation is shown; the information (programs and data) is typically stored on the hard-disk and loaded (at least partially) into the working memory when the programs are running, together with an operating system and other application programs (not shown in the figure). The programs are initially installed onto the hard disk from CD-ROM.

A stack 205 processes a set of protocol layers working together for defining network communications. The stack 205 directly interfaces with an e-mail system 210. Operation of the e-mail system 210 is controlled through an input interface 215, which is used to enter data and/or commands (with the keyboard and the mouse) by the user of the computer.

The e-mail system 210 manages the transmission of messages (such notes entered from the keyboard or files stored on the hard-disk) over the communication network. A mailbox 220 is used by the e-mail system 210 for storing e-mail messages that have been received, sent, or deleted. New e-mail messages 225 created by the user of the computer are put into an outbox; the e-mail messages 225 are then provided to the stack 205, in order to be transmitted to one or more desired users. Moreover, whenever the user of the computer opens an e-mail message stored in the mailbox 220, the e-mail message is provided to a formatter 230; the formatter 230 drives an output buffer 235 accordingly, so as to display the e-mail message on the monitor of the computer.

Particularly, the e-mail system 210 supports multiple e-mail messages (typically multiple notes). A multiple note embeds a copy of a series of (basic) notes, for example received by the user of the computer from other users. In this way, the basic notes may be simultaneously forwarded to one or more desired users.

Similar considerations apply if the programs and data are structured in a different manner, if other modules or functions are provided, if the multiple note includes basic notes sent by the user of the computer, if equivalent (basic and multiple) electronic mail messages are envisaged, and the like.

As shown in FIG. 3*a*, the computer is provided with a graphical user interface, with the screen 130 that is arranged to resemble a single desktop. The user interacts with programs running on the computer by generating a sequence of mouse and keyboard commands; a current position on the desktop, to which the mouse points, is denoted with an arrow 305.

In the example at issue, the desktop includes an application bar 310 (APP1, APP2 and APP3) and a full-screen window 315 for the e-mail system (with a title bar, a menu bar, and a series of command buttons). The window 315 displays a multiple note 320 that has been opened by the user of the computer (for example, a multiple note just received from another user). The multiple note 320 has a title 325, which includes a subject (describing the content of the message), an address (or a corresponding nickname) of the user sending the message and of each user to which the message is directed, a priority identifier, and the like. A body of the multiple note 320 is formed by a series of N basic notes (for example N=4) that have been embedded in the message; each basic note consists of a title 330 and a body 335 (TITLEi and BODYi, respectively, with i=1 ... N).

In an e-mail system according to the prior art, as shown in the figure, the basic notes 330,335 are appended in a sequential order (within the body of the multiple note 320). As a consequence, only the title 330 and (part of) the body 335 of the first basic note (TITLE1 and BODY1, respectively) are displayed in the window 315; scrolling of the multiple note 320 is then required to display the other basic notes.

Moving now to FIG. 3b (the elements corresponding to the ones shown in the FIG. 3a are denoted with the same references, and their explanation is omitted for the sake of simplicity), a multiple note 340 according to a preferred embodiment of the invention is shown. In this case, contrary to the prior art, the basic notes 330,335 are inserted into a tabbed pane 345.

The tabbed pane 345 consists of multiple overlying panels 350; the panels resemble a stack of pieces of paper lying on top of one another, with only the topmost panel that is visible to the user. A selection tab 355 is attached to each panel 350. The user of the computer chooses which panel to view by selecting the tab 355 corresponding to the desired panel 350; the selected panel 350 is then popped up and moved to the top of the stack.

Each panel 350 and the corresponding tab 355 are associated with a respective basic note 330,335. Particularly, the (visible) panel 350 consists of a scrollable area, which is used to display the title 330 and the body 335 of a selected basic note. Each tab 355 is denoted with an identifier (IDi) of the corresponding basic note 330,335. Preferably, the identifier is formed by the first characters of the subject of the respective basic note 330,335 (which fit into the tab 355 according to its current length); for example, the identifier consists of 30 characters when the tabbed pane has two tabs, 20 characters when the tabbed pane has three tabs, 15 characters when the tabbed pane has four tabs, and so on. Alternatively, the identifier includes a further row for the address of the user from which the basic note has been received.

In this way, the identifiers of all the basic notes 330,335 are simultaneously displayed in the window 315. The user of the computer selects the basic note 330,335 to view by simply clicking with the mouse on the corresponding tab 355. For example, if the user selects the tab 355 denoted with ID3, this tab is moved in the front line and the corresponding panel 350 (TITLE3 and BODY3) is made visible, as shown in the figure.

Similar considerations apply if the e-mail system has a different graphical appearance, if a multiple note under construction or sent by the user of the computer is displayed, if the multiple note is shown in a preview frame (without being opened), if the multiple note embeds a different number of basic notes, if the tabbed pane has a different structure (for example, with the tabs placed elsewhere or distributed in two or more rows), if the identifiers have a different length, if the whole selected basic note is displayed in the corresponding panel, and the like.

Considering now FIG. 4, a method 400 is performed on the computer when the e-mail system is running (it should be noted that the method is described with a flow chart for the sake of simplicity, although the e-mail system typically operates according to the object-oriented paradigm).

The method starts at block 403 and then enters an idle loop at block 406 waiting for an event to occur. Particularly, if the user has selected the creation of a new multiple note the blocks 409-424 are executed, whereas if a multiple note has been received the blocks 427-448 are executed; in both cases, the method then returns to block 406, waiting for a new event. Conversely, if the e-mail system has been closed, the method ends at the final block 454.

Considering block 409 (new multiple note), a template for the message is opened; for example, the title of the template has a field FROM (identifying the sender of the multiple note) that is filled with a pre-defined address of the user of the computer. Passing to block 412, the user fills in the different fields of the title of the multiple note (for example, inserting its subject and choosing the users to which the message is directed from an address-book). The method continues to block 415, wherein the user selects a series of (basic) notes to be embedded in the multiple note from the mailbox.

As soon as editing of the multiple note is completed, the method proceeds to block 421. Formatting tags are inserted into the multiple note, in order to organise its basic notes into a tabbed pane. Particularly, the tags define the tabbed pane and a new row for each basic note; for each row, the first characters of the subject of the basic note are copied between the tags denoting the respective tab, whereas the whole basic note is placed between the tags denoting the piece of information to be displayed in the respective panel. The method then descends into block 424, wherein the multiple note so obtained in put into the outbox, in order to be transmitted to the desired users.

Referring now to block 427 (receiving), a multiple note received from another user is selected and opened, in order to read its content. The method then passes to block 430, wherein the title of the multiple note is displayed. Continuing to block 433, the e-mail system interprets the formatting tags inserted in the multiple note. Particularly, the tabbed pane is created at block 436. The corresponding tabs are displayed at block 439 (with the first one that is selected and put in the front line as a default), and the basic note associated with the first tab is displayed into the corresponding panel at block 439.

Moving to block 442, different operations are carried out in response to the action performed by the user. Particularly, if the user wishes to view a different basic note, the corresponding tab is selected at block 445; proceeding to block 448, the panel associated with the selected tab is popped up and moved to the top of the stack (so as to display the corresponding basic note). Referring back to block 442, if the user moves a cursor along the basic note currently displayed in the selected panel, its text scrolls through the panel. In both cases, the method then returns to block 442 waiting for a new action by the user. Conversely, if the user closes the multiple note, the method returns to block 406 directly.

Similar considerations apply if an equivalent method is performed, if other functions are provided (for example, for saving a draft of the multiple note), if the new multiple note is created in a different manner, if the formatting tags are replaced with equivalent instructions, and the like.

More generally, the present invention provides a method of controlling multiple electronic mail messages in a data processing system. The method starts with the step of providing a multiple electronic mail message, which embeds a plurality of forwarded basic electronic mail messages. The multiple message is read. In the method of the invention, a selection structure is provided; the selection structure has a plurality of selectable items, each one associated with an identifier of a corresponding basic message. The basic message associated with a selected item (or a part thereof) is then displayed.

The devised solution makes it easier to control the multiple note, particularly when the number of basic notes is high (even if its use with any number of basic notes is contemplated and within the scope of the invention).

The arrangement of the basic notes proposed by the present invention results is a very simple representation of the multiple note. Particularly, the user may easily select and read any desired basic note. Moreover, moving from one basic note to another basic note is simple and fast. In addition, the envisaged representation immediately provides an indication of all the basic notes included in the multiple note.

The preferred embodiment of the invention described above offers further advantages.

Particularly, the identifier associated with each basic note includes at least part of a subject of the basic note.

In this way, the identifier associated with each basic note may be automatically defined when creating the multiple note (without any intervention on the part of the user); moreover, the subject is very effective in identifying the corresponding basic note.

In a different embodiment of the invention, each identifier also includes an indication of an originator of the corresponding basic note.

This feature further improves the association of each identifier with the corresponding basic note, particularly when several basic notes relate to the same subject matter.

However, the solution of the invention leads itself to be implemented even associating a different identifier with each basic note, for example consisting of the whole title of the basic note or of a progressive number, and even with the identifier that is typed by the user directly when editing the multiple note.

As a further improvement, the identifiers associated with the basic notes are simultaneously displayed in a dedicated area of the monitor, whereas the selected basic note is displayed in a further dedicated scrollable area of the monitor.

The proposed structure directly provides an outlook of all the basic notes embedded in the multiple note; moreover, this feature makes it easier to choose and go through a desired basic note.

Preferably, the basic notes are arranged in a tabbed pane.

This graphic object is particularly effective, simple, and user-friendly.

Alternatively, a different selection structure is employed (for example consisting of a series of check boxes), or the identifiers associated with the basic notes are not always simultaneously displayed on the monitor (for example, they are associated with the items of a cascading menu).

In a particularly advantageous embodiment of the invention, formatting tags for causing the multiple note to be displayed according to the proposed representation are inserted into the multiple note when it is created.

This solution makes it possible to use any standard e-mail system (supporting the formatting tags) for displaying the multiple note according to the present invention.

As a consequence, a program for creating the multiple note as described above is also suitable to be put on the market as a stand-alone product, in order to be used with existing programs running on the computers to which the multiple note is addressed. Moreover, any data carrier (such as the working memory of the computer on which the multiple note is displayed) storing the multiple note including these formatting tags is likewise suitable to drive existing programs for displaying the multiple note according to the present invention.

However, the envisaged method leads itself to be implemented even with a different architecture. For example, in an alternative embodiment of the invention the program running on the computer wherein the multiple note is created only inserts a specification of the basic notes; conversely, the representation of the multiple note is directly controlled by the program running on the computer wherein the multiple note is displayed.

Advantageously, the solution according to the present invention is implemented with a computer program (software), which is provided on CD-ROM.

Alternatively, the program is provided on floppy-disk, is pre-loaded onto the hard-disk, or is stored on any other computer readable medium, is sent to the computer through a network (typically the INTERNET), is broadcast, or more generally is provided in any other form directly loadable into a working memory of the computer. However, the method according to the present invention is also suitable to be carried out with a hardware structure, for example integrated in a chip of semiconductor material.

Naturally, in order to satisfy local and specific requirements, a person skilled in the art may apply to the solution described above many modifications and alterations all of which, however, are included within the scope of protection of the invention as defined by the following claims.

The invention claimed is:

1. A method of controlling a multiple electronic mail message in a data processing system comprising the steps of:
   providing a multiple electronic mail message having embedded therein a plurality of basic electronic mail messages that have been sent from or forwarded by a plurality of users;
   reading the multiple electronic mail message;
   presenting a user interface, wherein the user interface presents at least a portion of a first basic electronic mail message within the plurality of basic electronic mail messages and a selection structure having a plurality of selectable items, wherein each selectable item within the plurality of selectable items is associated with an identifier of a corresponding basic electronic mail message within the plurality of basic electronic mail messages; and
   responsive to selection of one of the plurality of selectable items, at least partially presenting a second basic electronic mail message associated with the selected item.

2. The method according to claim 1, wherein each identifier includes at least part of a subject of the corresponding basic message.

3. The method according to claim 1, wherein each identifier includes an indication of an originator of the corresponding basic message.

4. The method according to claim 1, further comprising the steps of:
   simultaneously displaying the identifiers associated with all the basic electronic mail messages in a dedicated area of the user interface; and displaying the second basic electronic mail message associated with the selected item in a further dedicated scrollable area of the user interface.

5. The method according to claim 4, further comprising the steps of:

displaying a tabbed pane including a plurality of overlaying panels and a plurality of selection tabs each one for a corresponding panel, each basic message and the corresponding item being associated with a panel and the corresponding tab, respectively; and making visible the panel corresponding to a selected tab.

6. The method according to claim 1, further comprising the steps of:

creating the multiple message in a further data processing system, the multiple message including formatting instructions for causing the data processing system to display the selection structure and the basic message associated with the selected item when the multiple message is read; and transmitting the multiple message from the further data processing system to the data processing system.

7. A data carrier storing a multiple electronic mail message embedding a plurality of forwarded basic electronic mail messages, characterized in that the multiple message includes formatting instructions for causing a data processing system to display a selection structure having a plurality of selectable items each one associated with an identifier of a corresponding basic message and to at least partially display the basic message associated with a selected item when the multiple message is read.

8. A data processing system comprising:

means for providing a multiple electronic mail message having embedded therein a plurality of basic electronic mail messages that have been sent from or forwarded by a plurality of users;

means for reading the multiple electronic mail message, characterized in that the system further includes means for presenting a user interface, wherein the user interface presents at least a portion of a first basic electronic mail message within the plurality of basic electronic mail messages and a selection structure having a plurality of selectable items, wherein each selectable item within the plurality of selectable items is associated with an identifier of a corresponding basic electronic mail message within the plurality of basic electronic mail messages; and means, responsive to selection of one of the plurality of selectable items, for at least partially presenting a second basic electronic mail message associated with the selected item.

9. A data processing system comprising:

means for creating a multiple electronic mail message embedding a plurality of forwarded basic electronic mail messages;

means for transmitting the multiple message to a further data processing system;

means for including formatting instructions into the multiple message for causing the further data processing system to display a selection structure having a plurality of selectable items each one associated with an identifier of a corresponding basic message and to at least partially display the basic message associated with a selected item when the multiple message is read.

10. A computer program product in a computer storage medium for a data processing system of controlling a multiple electronic mail message comprising:

means for providing a multiple electronic mail message having embedded therein a plurality of basic electronic mail messages that have been sent from or forwarded by a plurality of users;

means for reading the multiple electronic mail message;

means for presenting a user interface, wherein the user interface presents at least a portion of a first basic electronic mail message within the plurality of basic electronic mail messages and a selection structure having a plurality of selectable items, wherein each selectable item within the plurality of selectable items is associated with an identifier of a corresponding basic electronic mail message within the plurality of basic electronic mail messages; and means, responsive to selection of one of the plurality of selectable items., for at least partially presenting a second basic electronic mail message associated with the selected item.

11. The product according to claim 10, wherein each identifier includes at least part of a subject of the corresponding basic message.

12. The product according the claim 10, wherein each identifier includes an indication of an originator of the corresponding basic message.

13. The product according to claim 10, further comprising:

means for simultaneously displaying the identifiers associated with all the basic electronic mail messages in a dedicated area of the user interface; and means for displaying the second basic electronic mail message associated with the selected item in a further dedicated scrollable area of the user interface.

14. The product according to claim 13, further comprising:

means for displaying a tabbed pane including a plurality of overlaying panels and a plurality of selection tabs each one for a corresponding panel, each basic message and the corresponding item being associated with a panel and the corresponding tab, respectively; and means for making visible the panel corresponding to a selected tab.

15. The product according to claim 10, further comprising:

means for creating the multiple message in a further data processing system, the multiple message including formatting instructions for causing the data processing system to display the selection structure and the basic message associated with the selected item when the multiple message is read; and means for transmitting the multiple message from the further data processing system to the data processing system.

16. An apparatus for controlling a multiple electronic mail message in a data processing system comprising:

a processor; and a memory coupled to the processor, wherein the memory contains instructions which, when executed by the processor, cause the processor to:

provide a multiple electronic mail message having embedded therein a plurality of basic electronic mail messages that have been sent from or forwarded by a plurality of users;

read the multiple electronic mail message;

present a user interface, wherein the user interface presents at least a portion of a first basic electronic mail message within the plurality of basic electronic mail messages and a selection structure having a plurality of selectable items, wherein each selectable item within the plurality of selectable items is associated with an identifier of a corresponding basic electronic mail message within the plurality of basic electronic mail messages; and responsive to selection of one of the plurality of selectable items, at least partially present a second basic electronic mail message associated with the selected item.

17. The apparatus of claim 16, wherein each identifier includes at least part of a subject of the corresponding basic message.

18. The apparatus of claim 16, wherein each identifier includes an indication of an originator of the corresponding basic message.

19. The apparatus of claim 16, wherein the instructions, when executed by the processor, further cause the processor to:

simultaneously display the identifiers associated with all the basic electronic mail messages in a dedicated area of the user interface; and display the second basic electronic mail message associated with the selected item in a further dedicated scrollable area of the user interface.

20. The apparatus claim 19, wherein the instructions, when executed by the processor, further cause the processor to:

display a tabbed pane including a plurality of overlaying panels and a plurality of selection tabs each one for a corresponding panel, each basic message and the corresponding item being associated with a panel and the corresponding tab, respectively; and make visible the panel corresponding to a selected tab.

* * * * *